US005668717A

United States Patent [19]

Spall

[11] Patent Number: 5,668,717

[45] Date of Patent: Sep. 16, 1997

[54] METHOD AND APPARATUS FOR MODEL-FREE OPTIMAL SIGNAL TIMING FOR SYSTEM-WIDE TRAFFIC CONTROL

[75] Inventor: James C. Spall, Ellicott City, Md.

[73] Assignee: The Johns Hopkins University, Baltimore, Md.

[21] Appl. No.: 545,049

[22] Filed: Oct. 12, 1995

Related U.S. Application Data

[63] Continuation-in-part of Ser. No. 364,069, Dec. 27, 1994, Pat. No. 5,513,098, which is a continuation of Ser. No. 73,371, Jun. 4, 1993, abandoned.

[51] Int. Cl.$^6$ .................. G05B 13/04; G06F 15/18

[52] U.S. Cl. .................. 364/148; 364/158; 395/21; 395/919; 701/117

[58] Field of Search .................. 364/148, 147–151, 364/157, 158, 164, 165, 436–438; 395/21–23, 904, 905, 912, 913, 919, 906

[56] References Cited

U.S. PATENT DOCUMENTS

| | | | |
|---|---|---|---|
| 5,119,468 | 6/1992 | Owens | 364/165 X |
| 5,159,660 | 10/1992 | Lu et al. | 364/165 X |
| 5,175,678 | 12/1992 | Frerichs et al. | 364/165 X |
| 5,268,834 | 12/1993 | Sanner et al. | 364/151 |
| 5,282,261 | 1/1994 | Skeirik | 364/164 X |
| 5,285,377 | 2/1994 | Sugasaka et al. | 364/164 X |
| 5,291,390 | 3/1994 | Satov | 364/148 |
| 5,448,484 | 9/1995 | Bullock et al. | 364/436 |
| 5,513,098 | 4/1996 | Spall et al. | 364/157 |

OTHER PUBLICATIONS

James C. Spall, "Multivariate Stochastic Approximation Using A Simultaneous Perturbation Gradient Approximation", Mar. 1992, pp. 332–341, IEEE Trans O/V Automatic Control vol. 37 No. 3.

James C. Spall and John A. Cristion, "Neural Networks for Control of Uncertain Systems", 8–10 Apr. 1991, pp. 575–588, Tech. Proceedings, Test Technology Symposium IV, Tech Development Div., Directrate for Technology, U.S. Army Test and Gualuation Command.

James C. Spall, "Multivariate Stochastic Approximation Using a Simultaneous Perturbation Gradient Approximation" Aug. 6–9 1990, pp. 32–41, American Statistical Assocation, Alexandria VA. Annual Meeting, Proc. of the Bus and Econ. Statistics Section.

James C. Spall, "A Stochastic Approximation Algoritm for Large–Dimensional Systems in the Kiefer–Wolfowitz Setting", Dec. 1988, pp. 1544–1548, Proc. of the 27th Conf. on Decision and Control, Austin, Texas.

*Primary Examiner*—Joseph Ruggiero

*Attorney, Agent, or Firm*—Francis A. Cooch

[57] ABSTRACT

A method and apparatus for model-free, real-time, system-wide signal timing for a complex road network is provided. It provides timings in response to instantaneous flow conditions while accounting for the inherent stochastic variations in traffic flow through the use of a simultaneous perturbation stochastic approximation (SPSA) algorithm. This is achieved by setting up several (M) parallel neural networks, each of which produces optimal controls (signal timings) for any time instant (within one of the M time periods) based on observed traffic conditions. The SPSA optimization technique is critical to the feasibility of the approach since it provides the values of weight parameters in each of the neural networks without the need for a model of the traffic flow dynamics.

32 Claims, 3 Drawing Sheets

METHOD AND APPARATUS FOR MODEL-FREE OPTIMAL SIGNAL TIMING FOR SYSTEM-WIDE TRAFFIC CONTROL

CROSS-REFERENCES TO RELATED APPLICATIONS

This application is a continuation-in-part of application Ser. No. 08/364,069 filed Dec. 27, 1994, now U.S. Pat. No. 5,513,098, which is a continuation of application Ser. No. 08/073,371 filed Jun. 4, 1993, now abandoned.

STATEMENT OF GOVERNMENTAL INTEREST

The Government has rights in this invention pursuant to Contract No. N00039-94-C-0001 awarded by the Department of the Navy.

BACKGROUND OF THE INVENTION

The invention relates to data processing systems and, more specifically, to a computerized traffic management system for optimizing vehicular flow in complex road systems.

A long-standing problem in traffic engineering is to optimize the flow of vehicles through a given road network. A major component of advanced traffic management for complex road systems is the timing strategy for the signalized intersections. Improving the timing of the traffic signals in the network is generally the most powerful and cost-effective means of achieving this goal.

Through use of an advanced transportation management system, that includes sensors and computer-based control of traffic lights, a municipality seeks to more effectively use the infrastructure of the existing transportation network, thereby avoiding the need to expand infrastructure to accommodate growth in traffic. It appears that much of the focus to date has been on the hardware (sensors, detectors, and other surveillance devices) and data processing aspects. In fact, however, the advances in these areas will be largely wasted unless they are coupled with appropriate analytical techniques for adaptive control.

Because of the many complex aspects of a traffic system, e.g., human behavioral considerations, vehicle flow interactions within the network, weather effects, traffic accidents, long-term (e.g., seasonal) variation, etc., it has been notoriously difficult to determine the optimal signal timing. This is an extremely challenging control problem at a system (network)-wide (multiple intersection) level. Much of the signal timing difficulty has stemmed from the need to build extremely complex models of the traffic dynamics as a component of the control strategy.

System-wide control is the means for real-time (demand-responsive) adjustment of the timings of all signals in a traffic network to achieve a reduction in overall congestion consistent with the chosen system-wide measure of effectiveness (MOE). This real-time control is responsive to instantaneous changes in traffic conditions, including changes due to accidents or other traffic incidents. Further, the timings should change automatically to adapt to long-term changes in the system (e.g. street reconfiguration or seasonal variations). To achieve true system-wide optimality, the timings at different signals will not generally have a predetermined relationship to one another (except notably for those signals along one or more arteries within the system where it is desirable to synchronize the timings).

All known attempts for real-time demand responsive control either are optimized only on a per-intersection basis or make simplifying assumptions to treat the multiple-intersection problem. An example of the former is OPAC described in Gartner, N. H., Tarnoff, P. J., and Andrews, C. M. (1991), "Evaluation of Optimized Policies for Adaptive Control Strategy," *Transportation Research Record* 1324, pp. 105–114, while examples of the latter include SCOOT described in Hunt, P. B., Robertson, D. I., Bretherton, R. D. and Winton, R. I. (1981), "SCOOT—A Traffic Responsive Method of Coordinating Signals," Transport and Road Research Lab., Crowthorne, U. K., Rep. LR 1014 and Martin, P. J. and Hockaday, S. L. M. (1995), "SCOOT—An Update," *ITE Journal*, January 1995, pp. 44–48, and REALBAND described in Dell'Olmo, P. and Mirchandani, P. (1995), "An Approach for Real-Time Coordination of Traffic Flows on Networks," Transportation Research Board Annual Meeting, Jan. 22–28, 1993, Washington, D.C., Paper no. 950837.

The SCOOT method's version of system-wide control differs from the above definition of system-wide control in that it tends to lump cycle length adjustment for groups of intersections into single parameters, and thus the option of full independent signal adjustments is not completely available. SCOOT's system-wide (i.e. multiple, interconnecting artery) approach is limited to broad strategy choices from one traffic corridor to another rather than a coordinated set of signal parameter selections for the entire network. Hence, although SCOOT may be implemented on a full traffic system, it is not a true system-wide controller in the sense considered here.

The other multiple intersection technique mentioned above, REALBAND, provides a way to improve platoon progression, which the other techniques apparently lack. However, REALBAND is limited in its application to types of traffic patterns for which vehicle platoons are easily identifiable and, thus, may not perform well in heavily congested conditions with no readily identifiable platoons. Finally, neither of these techniques incorporates a method to automatically self-tune over a period of weeks or months.

The essential ingredient in all previous attempts to provide signal timings for single or multiple intersections is a model for the traffic behavior. However, the problem of fully modeling traffic at a system-wide level is daunting.

In the OPAC, SCOOT, and REALBAND approaches discussed above, the models used are in the form of traditional equation-based relationships, but it is also possible to use other model representations such as a neural network, fuzzy associative memory matrix or rules base for an expert system. The signal timings are then based on relationships (algebraic or otherwise) derived from the assumed model of the traffic dynamics. For real-time (demand-responsive) approaches, this relationship (or "control function") takes information about current traffic conditions as input and produces as output the timings for the signals. However, to the extent that the traffic dynamics model is flawed or oversimplified, the signal timings will be suboptimal.

The application of neural networks (NNs) to traffic control has been proposed and examined by, e.g., Dougherty, M., Kirby, H., and Boyle, R. (1993), "The Use of Neural Networks to Recognize and Predict Traffic Congestion," *Traffic Engineering and Control*, pp. 311–314 and in Nataksuji, T. and Kaku, T. (1991), "Development of a Self-Organizing Traffic Control System Using Neural Network Models," *Transportation Research Record*, 1324, TRB, National Research Council, Washington, D.C., pp. 137–145. These NN-based control strategies still require a model (perhaps a second NN) for the traffic dynamics, which is usually constructed off-line using system historical data.

This would also apply to controllers based on principles of fuzzy logic or expert systems (e.g., Kelsey, R. L. and Bisset, K. R. (1993), "Simulation of Traffic Flow and Control Using Fuzzy and Conventional Methods," *Fuzzy Logic and Control* (Jamshidi, M., et al., eds.), Prentice Hall, Englewood Cliffs, N.J., Chapter 12, and Ritchie, S. G. (1990), "A Knowledge-Based Decision Support Architecture for Advanced Traffic Management," *Transportation Research-A*, vol. 24A, pp. 27–37). For both of these approaches, there is still a need for a system model (aside from a control model). In these approaches, the system model is not a set of equations, but instead is a detailed list of rules that express "if-then" relationships (either directly or through a so-call fuzzy associative memory matrix). Similar to other model-based controllers, these "if-then" relationships must be determined initially and periodically recalibrated.

The extreme difficulty in mathematically describing such critical elements of the traffic system as complex flow interactions among the arteries in the presence of traffic congestion, weather-related changes in driving patterns, flow changes as a result of variable message signs or radio announcements, etc., will inherently limit any control strategy that requires a model of the traffic dynamics. Related to this is the non-robustness of system model-based controls to operational traffic situations that differ significantly from situations represented in the data used to build the system model (this non-robustness can sometimes lead to unstable system behavior). Further, even if a reliable system model could be built, a change to the scenario or measure-of-effectiveness (MOE) would typically entail many complex calculations to modify the model and requisite optimization process.

In addition to the above considerations, system-wide control (as defined above) requires that the controller automatically adapt to the inevitable long-term (say, month-to-month) changes in the system. This is a formidable requirement for the current model-based controllers as these long-term changes encompass difficult-to-model aspects such as seasonal variations in flow patterns on all links in the system, long-term construction blockages or lane reconfiguration, changes in the number of residences and/or businesses in the system, etc. In fact, in the context of the Los Angeles traffic system, the difficulty and high costs involved in adapting to long-term system changes is a major limitation of current traffic control strategies.

In sum, there exists a need for a traffic control approach that can achieve optimal system-wide control in a complex road system by automatically adapting to both daily non-recurring events (accidents, temporary lane closures, etc.) and to long-term evolution in the transportation system (seasonal effects, new infrastructure, etc.).

SUMMARY OF THE INVENTION

The invention solves the problems discussed above because it does not require a mathematical (or other) model of the system-wide traffic dynamics due to the use of a powerful method in stochastic optimization.

The invention is based on a neural network (or other function approximator) serving as the basis for the control law, with the weight estimation occurring in closed-loop mode via the simultaneous perturbation stochastic approximation (SPSA) algorithm while the system is being controlled. Inputs to the NN-based controller would include real-time measurements of traffic flow conditions, previous signal control settings, and desired flow levels for the different modes of transportation. Since the SPSA algorithm requires only loss function measurements (no gradients of the loss function), there is no system-wide model (e.g., set of differential equations or a second neural network) required for the weight estimation (traffic dynamics). Thus, the invention does not require that equations be built describing critical traffic elements such as complex flow interactions among the arteries in the presence of traffic congestion, weather-related changes in driving patterns, flow changes as a result of variable message signs or radio announcements, etc.

The NN is used only for the controller (i.e., no NN or other mathematical model is needed for the system dynamics). This allows for the control algorithm to more readily adjust to long-term changes in the transportation system. Since the invention does not require a system model, the expense and difficulty of recalibrating the model is avoided. Furthermore, the invention avoids the seemingly hopeless problems of (1) attempting to mathematically model human behavior in a transportation system (e.g., modelling how people would respond to radio announcements of an accident situation) and (2) of modelling the complex interactions among flows along different arteries.

The invention, by avoiding the need for a complex system model, is able to produce a system-wide controller that generates optimal instantaneous (minute-to-minute) signal timings while automatically adapting to long-term (month-to-month) system changes.

DETAILED DESCRIPTION

The invention is based on developing a mathematical function, e.g., u(.), that takes current information on the state of the traffic conditions and produces the timings for all signals in the network to optimize the performance of the system. (A dot shown here as an argument in a mathematical function represents all relevant variables entering the function.) The inputs to u(.) (and resulting output timing values) can be changed on an instant-to-instant (e.g., every 30 seconds) basis. Typical inputs would include sensor readings from throughout the traffic system and other relevant information such as weather and time-of-day. The output values for each of the signals in the network may be any of the usual timing quantities: e.g., green/red splits, offsets, and cycle times.

The traffic control function u(.) in the invention is implemented by a neural network (NN) for which the internal NN connection weights are estimated and refined by an on-line training process. The weights embody information acquired from real-time traffic responses to previous NN controls and from historical data and/or traffic simulations used in the initialization of the weight estimation process. Once these weights are properly specified, there will be a fully defined function what will take sensor information on current traffic conditions at any time and produce the optimal system-wide timings for the time. (Any reasonable mathematical function can be approximated to a high level of accuracy by a NN if (and only if) the weights are properly estimated. In this case, the NN is being used to approximate the (unknown) optimal control function for the signal timings.) It is within these weights that information about the optimal control strategy is embedded.

To reflect reality, it is important that the weights contain short-term information to facilitate a response to instantaneous traffic conditions (including accidents or other incidents) and that they be able to evolve in the long-term (e.g., month-to-month) in accordance with the inevitable long-term changes in the transportation system. Hence, the values of the weights are absolutely critical to this framework.

The fundamental optimization algorithm used in the invention for the on-line weight estimation is the simultaneous perturbation stochastic approximation (SPSA) algorithm. (See Spall, J. C. (1992), "Multivariate Stochastic Approximation Using a Simultaneous Perturbation Gradient Approximation," *IEEE Trans. on Automatic Control*, vol. 37, pp. 332–341.) Note that SPSA is fundamentally different from infinitesimal perturbation analysis (IPA). SPSA uses only loss function evaluations in its optimization while IPA uses the gradient of the loss function. For control problems, requiring the gradient is equivalent to requiring a network-wide model of the system; evaluating the loss function alone does not require a model.

Figure 1:
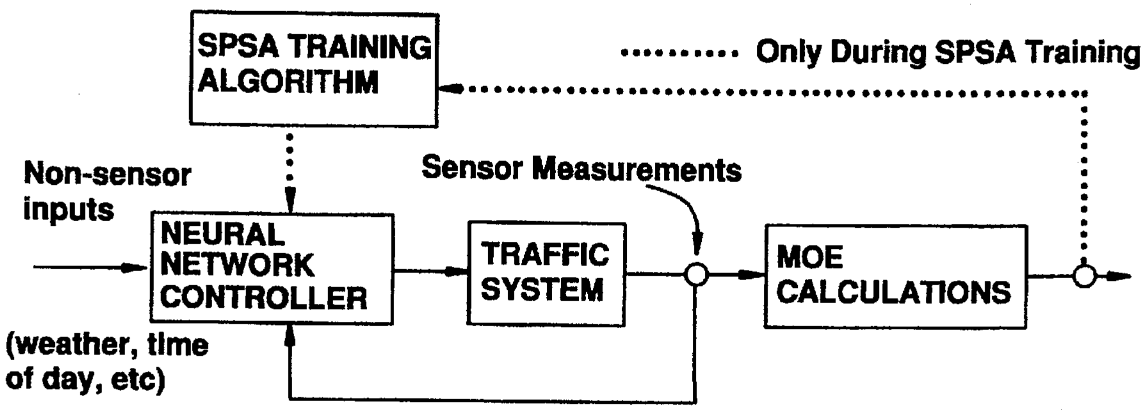
FIG. 1 is a block diagram illustrating the implementation of the invention for system-wide traffic control.

It is the use of the SPSA methodology to train and continually to adjust the NN weights that is unique to the invention's approach and is critical to the successful development of a NN-based control mechanism that does not require a model (NN or otherwise) of the traffic system dynamics. FIG. 1 illustrates the overall relationship between the NN control, the traffic system to be controlled and the SPSA training process.

The invention (like any other demand-responsive controller) requires real-time sensor data related to the traffic flow. In some cases, the measure-of-effectiveness (MOE) of interest can be formulated directly in terms of the sensor data, e.g., an MOE measuring vehicles/unit time passing through the network intersections can be calculated directly from common "loop detectors" at the intersections that provide vehicle counts.

In other cases, the MOE may involve quantities not directly related to the available sensors, e.g., an MOE that reflects total vehicle wait time at intersections cannot be determined directly from loop detector data. In such cases, some modeling is required to relate the sensor data to the MOE (this requirement, of course, applies to any control technique).

The modeling required, however, is usually much simpler than attempting to model the underlying traffic dynamics that relate the signal timings to the MOE at a network-wide level (as discussed above). The reason for this relative simplicity is that the relationship between the sensor data and MOE is typically much more direct, short-term, and localized than the effect of a set of signal timings on the network-wide traffic flow (e.g., loop detectors near an intersection can provide data for reliable estimation of vehicle wait time at the intersection; these estimated wait times can then be summed to provide the estimated network-wide wait time).

There is ongoing work on advanced traffic sensors, together with prototype implementations. It is expected that these sensors will allow for direct calculation of MOEs related to, e.g., total vehicle wait time.

As discussed above, the NN-based control u(.) used in the invention depends on a set of weight coefficients, which must be estimated. After these weights are properly specified, there is a fully defined function u(.) that takes state information on traffic conditions at any given time of day and produces optimal instantaneous signal timings. As a stochastic approximation algorithm, SPSA is explicitly designed to extract essential information in spite of stochastic variations in traffic flow.

The algorithm for determining the NN weights (i.e., the "training" process) is based on parallel estimation algorithms for different time periods throughout the day. More specifically, for each of, e.g., M, distinct time periods (generally not of equal length) within a 24 hour time interval, an SPSA estimation algorithm is set up that allows for updating of the values of weights for that period across days.

The periods are chosen so that there are roughly similar flow patterns within an period. A possible set of time periods (M=5) for a weekday period might be: 5:00 A.M.–9:30 A.M., 9:30 A.M.–3:30 P.M., 3:30 P.M.–7:30 P.M., 7:30 P.M.–11:30 P.M., and 11:30 P.M.–5:00 A.M.

Figure 2:
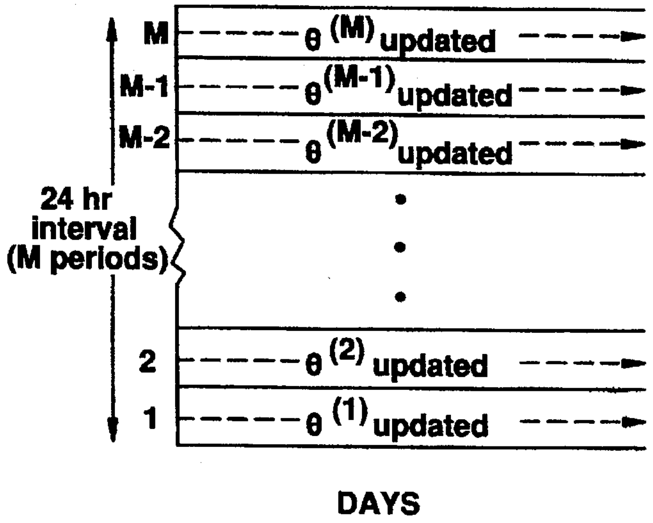
FIG. 2 is a conceptual illustration of the neural network training weight estimation process.

In this algorithm, there would be M separate NNs (one for each of the M distinct time periods), each with its own set of weights $\theta^{(m)}$, m=1,2, . . . , M. FIG. 2 provides a conceptual illustration of the training process. An individual weight vector $\theta^{(m)}$ is updated across days using the SPSA algorithm (more details on the algorithm are given below); in particular, the current value of $\theta^{(m)}$ is derived from the value of $\theta^{(m)}$ on earlier days, but is not based on other weight vectors $\theta^{(i)}$, $i \neq m$. In fact, the NN control u(.) at different times of day may have different inputs and outputs (and hence different sized vectors $\theta^{(m)}$) to reflect different control needs throughout the day (e.g., in rush hour periods all signals may be under active control while at late night times, certain signals may be set to flashing yellow/red).

Also the training is based on adjacent days having similar average traffic behavior within the time period. So, for example, there may be one set of M periods and corresponding recursions for weekdays (perhaps with a special "tag" for Friday evenings to accommodate the extra flow) and another set of periods and corresponding recursions for weekends/holidays.

The training process for each period will continue as long as needed to achieve effective convergence of the weight estimate; convergence is obtained when the MOE has been optimized subject to constraints on road capacity, minimum signal phase length, etc. While the SPSA training is occurring, only minor controller-imposed variations in traffic flow (from what would have occurred based on the previous [similar] day's timing strategy) will be seen, which should be unnoticed by most drivers.

After training is complete for a given period, say the $m^{th}$, a control function $u^{(m)}(.)$ (based on a converged value of weights $\theta^{(m)}$ ) will then exist that provides optimal signal timings for any specific time within the period given the current traffic conditions. Although there is a fixed value of $\theta^{(m)}$ after training is complete, the signal timings given by $u^{(m)}(.)$ will generally change throughout the period—possibly on a cycle-to-cycle basis—to adapt to instantaneous fluctuations in traffic conditions, i.e., the function $u^{(m)}(.)$ is the same during the $m^{th}$ period, but the specific output values of $u^{(m)}(.)$ will change during the period as the traffic conditions change.

If necessary, this idea can perhaps be made clearer by viewing the NN control $u^{(m)}(.)$ with specified weights as analogous to a polynomial function with specified coefficients. For a fixed set of coefficients, the value of the polynomial will change as the value of the independent variable changes. In contrast, a change in the coefficient values represents a change in the polynomial function itself. The former case is analogous to what happens in producing instantaneous controls for a fixed weight vector and the latter case is analogous to what happens as the NN undergoes its day-to-day training.

As part of the training process, an initial set of values (prior to running SPSA) must be chosen for the NN weights (these yield the control strategy on "day 0" of the training process). There are several ways to initialize the NN weights. Perhaps the simplest way is to set the weights such that the NN produces "reasonable" timings that vary with time of day but have limited dependence on observed traffic conditions.

Another relatively simple way to initialize the NN weights, would be to use current and recent-past data on traffic flow and corresponding (flow dependent) signal timings in conjunction with standard ("off the shelf") back-propagation-type software. This will generate a NN controller that is able to reproduce the timing strategy embedded in these data. Then the SPSA optimization process will begin with that strategy and improve from there. This off-line analysis is done only to initialize the weights in the algorithm. There is no need for modeling the traffic dynamics; nor is there any need for off-line estimation after the SPSA procedure begins.

Alternatively (or supplementarily), "pseudo historical" data could be generated by running traffic simulations together with corresponding "reasonable" (flow-dependent) signal timings. These pseudo historical data could then be used with back propagation (as with the real historical data) to generate the initial weights.

One appealing feature in using simulations for initialization is that it is possible to introduce "incidents" (accidents, break-downs, special events, etc.) that may not have been encountered in other initialization information (e.g., historical data). Having this incident information embedded in the initial weights may help the real-time NN controller cope with similar incidents in real operations after day 0. It is not required that all possible incident scenarios be introduced in the simulation since the NN can interpolate to unencountered incidents if the initialization information contains a reasonable variety of plausible incidents. Note that whatever initialization strategy is used, it is not particularly important that the initial weights (with their corresponding timing strategy) be chosen in some optimal manner since the SPSA algorithm will produce an improved timing strategy within a few days by adapting the weights to the actual traffic environment.

To be assured that the NN control $u^{(m)}(.)$ will produce optimal instantaneous signal timings after training is complete, the training process must see an adequate variety of traffic conditions in its day-to-day updating. The information associated with all the observed traffic conditions during training gets stored in the weights $\theta^{(m)}$. Thus, when faced with a new set of traffic conditions, the NN control can be expected to produce a good instantaneous control if it can interpolate to the new conditions from the information stored in the weights from previous days' training (and the weight initialization).

Of course, if truly anomalous conditions are encountered (where the information stored in the weights is inadequate for interpolation purposes), the NN control may be poor. In this case an override may be required. (Of course, a traditional model-based adaptive traffic control strategy would have the same problem since its model (and resulting controller) would only be as good as the data used in building the model. Encountering a traffic condition totally unlike anything seen or anticipated before is likely to result in a poor control, thereby also requiring an override. This is an inherent limitation of any control technique, model-based or not.)

Periodically, after effective convergence for $\theta^{(m)}$ has been achieved (and the controller is operating without the use of SPSA—see FIG. 1), the training should be turned "on" in order to adapt (update) the weights to the inevitable long-term changes in the traffic system and flow patterns. (The reason that it is not recommended to run training continuously day-to-day is that when the training is operative, the weight values $\theta^{(m)}$ used in the controller are slightly perturbed from those that the algorithm has currently found to be optimal.)

This updating can be done relatively easily without the need to do the expensive and time-consuming off-line modeling that is required for standard model-based approaches to traffic control (e.g., in the context of the Los Angeles traffic system, the adaptation to long-term changes is not done as frequently as necessary because of the high costs and extreme difficulty involved). Notice, however, that whether the training in SPSA is "on" or "off" should be invisible to most drivers.

The above outlines how NN functions for real-time traffic control can be constructed by setting up M parallel recursions, each of which iterates on a day-to-day basis for a fixed time period. The discussion below will provide the mathematical form of the recursion. Given the set of weights $\theta^{(m)}$ for the $m^{th}$ period (associated with the $m^{th}$ NN), $m \in \{1,2, \ldots, M\}$, we let $\hat{\theta}_k^{(m)}$ denote the estimate of $\theta^{(m)}$ at the $k^{th}$ iteration of the SPSA algorithm. Recall from FIG. 2 that m will cycle from 1 to M each 24 hour interval whereas k is updated across days. The aim of the SPSA algorithm is to find that set of weight values that minimizes some "loss function," which is directly related to optimizing the MOE. Mathematically, this is equivalent to finding a weight value such that the gradient of the loss function with respect to the weights is zero. However, since a model for the traffic dynamics is not assumed, it is not possible to compute this gradient for use in standard NN optimization procedures such as back-propagation.

The SPSA algorithm is based on forming a succession of highly efficient approximations to the uncomputable gradient of the loss function in the process of finding the optimal weights. The SP gradient approximation used in SPSA only requires observed values of the system (e.g., traffic queues, wait times, pollutant emission readings, etc.), not a model for the system dynamics.

Suppressing (for convenience) the superscript m, the SPSA algorithm for estimating $\theta(=\theta^{(m)})$ has the form:

$$\hat{\theta}_{k+1}=\hat{\theta}_k-a_k\hat{g}_k(\hat{\theta}_k) \qquad (1)$$

where $a_k$ is a positive scalar gain coefficient and $\hat{g}_k(\hat{\theta}_k)$ is the SP gradient estimate at $\theta=\hat{\theta}_k$. Note that eqn. (1) states that the new estimate of $\theta$ is equal to the previous estimate plus an adjustment that is proportional to the negative of the gradient estimate. The initial value $\hat{\theta}_o$ may be chosen according to the discussion above.

To calculate the most critical part of eqn. (1), i.e., the gradient approximation $\hat{g}_k(\theta)$ for any $\theta$, an underlying loss function $L(\theta)$ must be defined. This loss function is directly related to the MOE, and mathematically expresses the MOE criteria. The form of $L(\theta)$ reflects the particular system aspects to be optimized and/or the relative importance to put on optimizing several criteria at once (e.g., mean queue length or wait times at intersections, traffic flow along certain arteries, pollutant emissions, etc.). Because of the variety of MOE criteria considered in practice, the specific form of $L(\theta)$ will be allowed to be flexible.

The SPSA algorithm in eqn. (1) can be implemented for essentially any reasonable choice of $L(\theta)$. In fact, this is another advantage of the SPSA approach-namely the ease with which MOE criteria can be changed-since there is no need to recompute the complicated gradient expressions that are used in most other optimization algorithms. An example loss function for use in one of the M time periods might be $$L(\theta)=\sum_i E[\|x(t_i,\theta)\|^2 | u(\cdot)=u(\theta,\cdot)] \tag{2}$$

- $E[.|u(.)=u(\theta,.)]$ denotes an expected value conditional on a controller with weights $\theta$,
- $\|.\|$ represents the standard Euclidean norm of a vector,
- $x(t_i, \theta)$ represents the system state vector at some time $t_i$ (e.g., a vector of the maximum queues or vehicle wait times at all intersections during the $i^{th}$ five-minute period (surrounding the time $t_i$) within the overall time period); the state $x(t_i, \theta)$ depends on $\theta$ through the fact that the control used in affecting the state depends on $\theta$,
- $u(\theta,.)$ represents the control based on a set of weights $\theta$ (the dot represents the many other variables that feed into the controller, such as time-of-day, previous/current state values, previous control values, etc.), and
- the summation $\Sigma_i$ represents a sum over all relevant times within the period (e.g., a sum over all five-minute periods).

Thus, the problem of minimizing $L(\theta)$ in eqn. (2) is equivalent to finding the best weights $\theta$ for use in the control function to minimize the sum of squared state (e.g., wait times) magnitudes within the relevant time period. Obviously, other forms for $L(\theta)$ are possible, including having value non-zero target values for states based on road capacity (so that $\|x(.)\|^2$ gets replaced by $\|x(.)\text{-target}\|^2$) or having a non-quadratic criterion.

Given a definition of the loss function (as derived from the MOE), the critical step in implementing the SPSA algorithm in eqn. (1) is to determine the gradient estimate $\hat{g}_k(\theta)$ of any value of $\theta$. This embodies a key and unique technical contribution of the invention since $\hat{g}_k(\theta)$ does not require a model for the system-wide traffic dynamics.

Assuming that $\theta$ is p-dimensional, the gradient estimate at any $\theta$ has the form $$\hat{g}_k(\theta)=\begin{bmatrix}\dfrac{\hat{L}(\theta+c_k\Delta_k)-\hat{L}(\theta-c_k\Delta_k)}{2c_k\Delta_{k1}}\\ \cdot\\ \cdot\\ \cdot\\ \dfrac{\hat{L}(\theta+c_k\Delta_k)-\hat{L}(\theta-c_k\Delta_k)}{2c_k\Delta_{kp}}\end{bmatrix} \tag{3}$$

where $\hat{L}(.)$ denotes an observed (sample) value of $L(.)$, $\Delta_k=(\Delta_{k1}, \Delta_{k2}, \ldots, \Delta_{kp})$ is a user-generated vector of random variables that satisfy certain important regularity conditions, and $c_k$ is a small positive number. Note that the numerators in the p components of $\hat{g}_k(\theta)$ are identical; only the denominators change. Hence, to compute $\hat{g}_k(\theta)$, one only needs two values of $\hat{L}(.)$ independent of the dimension p. This is in contrast to the standard approach for approximating gradients (the "finite-difference" method), which requires 2p values of $\hat{L}(.)$ each representing a positive or negative perturbation of one element of $\theta$ with all other elements held fixed.

In the context of traffic control, each value of $\hat{L}(.)$ represents data collected during one time period (within one 24 hour period). For traffic control, the dimension p is at least as large as the total number of factors to be controlled within the traffic system (e.g., in a system with 100 signals and an average of four control factors per light, $p\geqq 400$). Hence, the SPSA method is easily two to three orders of magnitude more efficient than the standard finite-difference method in finding the optimal weights for most realistic traffic settings.

Below is a step-by-step summary of how the SPSA algorithm in eqns. (1) and (3) is implemented to achieve optimal traffic control in the system-wide setting. This summary pertains to building up the controller (i.e., estimating a $\theta^{(m)}$) for one time period, as illustrated in FIG. 2 above. Since the same procedure would apply in the other M-1 periods, we will suppress the superscript (m) on all quantities that would typically depend on the period considered (such as $\theta^{(m)}$, $\hat{\theta}_k^{(m)}$, $L^{(m)}(.)$, $\hat{g}_k^{(m)}(.)$, $u^{(m)}(.)$, etc.).

Starting with some $\hat{\theta}_o$ (see the discussion above) the step-by-step procedure for updating $\hat{\theta}_k$ to $\hat{\theta}_{k+1}$ (k=0, 1, 2, . . . ) is:

1. Given the current weight vector estimate $\hat{\theta}_k$, change all values to $\hat{\theta}_k+c_k\Delta_k$ where $c_k$ and $\Delta_k$ satisfy conditions set forth in Spall, J. C. and Cristion, J. A. (1992), "Direct Adaptive Control of Nonlinear Systems Using Neural Networks and Stochastic Approximation," *Proc. of the IEEE Conf. on Decision and Control*, pp. 878–883 and Spall, J. C. and Cristion, J. A. (1994), "Nonlinear Adaptive Control Using Neural Networks: Estimation with a Smoothed Simultaneous Perturbation Gradient Approximation," *Statistica Sinica*, vol. 4, pp. 1–27.

2. Throughout the given time period, use a NN control $u(\theta,.)$ with weights $\theta=\hat{\theta}_k+c_k\Delta_k$. Inputs to $u(\theta,.)$ at any time within the period include current state information (e.g., queues at intersections), previous controls (signal parameter settings), time-of-day, weather, etc.

3. Monitor system throughout time period (and possibly slightly thereafter) and form sample loss function $\hat{L}(\hat{\theta}_k+c_k\Delta_k)$ based on observed system behavior. For example, with the loss function in eqn. (2), we have $$\hat{L}(\hat{\theta}_k+c_k\Delta_k)=\Sigma\|x(t_i,\hat{\theta}_k+c_k\Delta_k)\|^2$$

where the state values are based on the control $u(\hat{\theta}_k+c_k\Delta_k,.)$.

4. During the same time period on following like day (e.g., weekday after weekday), repeat steps 1–3 with $\hat{\theta}_k-c_k\Delta_k$ replacing $\hat{\theta}_k+c_k\Delta_k$. Form $\hat{L}(\hat{\theta}_k-c_k\Delta_k)$.

5. With the quantities computed in steps 3 and 4, $\hat{L}(\hat{\theta}_k+c_k\Delta_k)$ and $\hat{L}(\hat{\theta}_k-c_k\Delta_k)$, form the SP gradient estimate in eqn. (3) and then take one iteration of the SPSA algorithm in eqn. (1) to update the value of $\hat{\theta}_k$ to $\hat{\theta}_{k+1}$.

6. (Optional) During same period on following like day, use a NN control with updated weights $\theta=\hat{\theta}_{k+1}$. This provides information on performance with current updated weight estimates (no perturbation); this information, is not explicitly used in the SPSA updating algorithm.

7. Repeat steps 1–6 with the new value $\hat{\theta}_{k+1}$ replacing $\hat{\theta}_k$ until traffic flow is optimized based on the chosen MOE.

There are several practical aspects of the above procedure that are worth noting. First, since each iteration of SPSA requires two days, it is to be expected that convergence to the improved (effectively optimal) weights would take a few months. While this training is taking place, the controls will not, of course, be optimal. Nevertheless, by initializing the weight vector at a value $\hat{\theta}_o$ that is able to produce the initial signal timings actually in the system (see above), the algorithm will tend to produce signal timings that are between the initial and improved timings while it is in the training phase. Hence, there will be no significant control-induced disruption in the traffic system during the training phase.

After the weight estimates have effectively converged (so that the controller produces improved signal timings for given traffic conditions), the algorithm may be turned "on" or "off" relatively easily without the need to perform detailed off-line modeling. It would, of course, be desirable to turn the algorithm "on" periodically in order to adapt to the inevitable long-term changes in the underlying traffic flow patterns.

A further point to note in using SPSA is that there will be some coupling between traffic flows in adjacent time periods. This is automatically accounted for by the fact that inputs to u(.) include previous states and controls (even if they are from the previous period). Hence, even though there are separate SPSA recursions for each of the M time periods, information is passed across periods to ensure true optimal performance.

An application of the approach of the invention will now be illustrated by a simulation. The small-scale realistic example below is intended to be illustrative of the ability of the invention to address larger-scale traffic systems and is not entirely trivial as it considers a congested (saturated) traffic network and includes nonlinear, stochastic effects. In particular, we are considering control for one four-hour time period and are estimating, across days, the NN weights for the collective set of traffic signal responses to instantaneous traffic conditions during this four-hour period.

The software used is described in detail in Chin, D. C. and Smith, R. H. (1994), "A Traffic Simulation for Mid-Manhattan with Model-Free Adaptive Signal Control," *Proc. of the* 1994 *Summer Computer Simulation Conf.*, San Diego, Calif., 18–20 Jul. 1994, pp 296–301. The simulation was conducted on an IBM 386 PC; and the software is written in the programming language C++. The traffic dynamics were simulated using state-space flow equations similar to those in Papageorgiou, M. (1990), "Dynamic Modeling, Assignment, and Route Guidance in Traffic Networks," *Transportation Research-B*, vol. 24B, pp 471–495 or Nataksuji and Kaku (1991) (see above) with Poisson-distributed vehicle arrivals at input nodes. Of course, consistent with the fundamental approach of the invention as it would be applied in a real system, the controller does not have knowledge of the equations being used to generate the simulated traffic flows.

The traffic simulation here is being applied as a surrogate for the real traffic system. SPSA on-line training in a real system would not require a traffic simulation. The controller is constructed via SPSA by the efficient use of small system changes and observation of resulting system performance. SPSA is explicitly designed to account for stochastic variations in the traffic flow in creating the NN weight estimates. The simulation will illustrate this capability.

Figure 3:
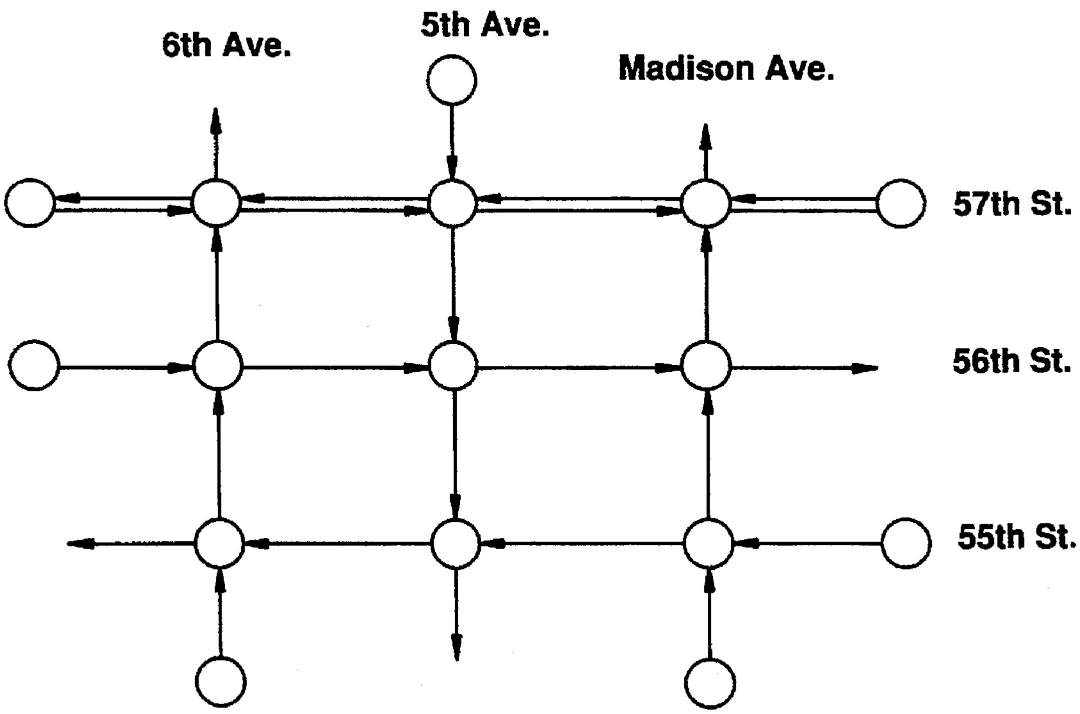
FIG. 3 is a schematic of a traffic simulation area in Mid-Manhattan.

Two studies were conducted for a simulated 90-day period: one with constant mean arrival rates over the total period, and another with a 10% step increase in all mean arrival rates into the network (not including the internal egress discussed below) on day 30 during the period. In both studies, the simulated traffic network runs between 55th and 57th Streets (North and South) and from 6th Avenue to Madison Avenue (East and West) and therefore includes nine intersections with 5th Avenue as the central artery. FIG. 3 depicts the scenario.

The time of control covers the four-hour period, from 3:30 p.m. to 7:30 p.m., which represents evening rush hour. The technique could obviously be applied to any other period during the day as well. In the four-hour control period several streets have their traffic levels gradually rising and then falling. Their traffic arrival rates increase linearly from non-rush hour rates starting at 3:30 p.m. The rates peak at 5:30 p.m. to a rush hour saturated flow condition and then subside linearly until 7:30 p.m. Back-ups occur during some of the four hour period in the sense that queues do not totally deplete during a green cycle.

Nonlinear, flow-dependent driver behavioral aspects are embedded in the simulation (e.g., the probabilities of turns of intersections are dependent on the congestion levels of the through street and cross street). Some streets have unchanging traffic statistics during the total time period while others have inflow rates from garage-generated egress at the end of office hours from 4:30 p.m. to 5:30 p.m. The simulation has been extensively tested to ensure that it produces traffic volumes that correspond to actual recorded data for the Manhattan traffic sector.

For the controller, a two-hidden-layer, feed-forward NN with 42 input nodes is used. The 42 NN inputs were (i) the queue levels at each cycle termination for the 21 traffic queues in the simulation, (ii) the per-cycle vehicle arrivals at the 11 external nodes in the system, (iii) the time from the start of the simulation, and (iv) the 9 outputs from the previous control solution. The output layer had 9 nodes, one for each signals green/red split. The two hidden layers had 12 and 10 nodes, respectively. For this NN, there were a total of 745 NN weights that must be estimated by the SPSA algorithm.

In response to current traffic conditions, the controller determines the green/red split for the succeeding cycle of each of the nine signals in the traffic network. Each signal operates on a fixed 90-second cycle (in a full implementation of the invention, cycle length for each signal could also be a control variable). The controller operates in a real-time adaptive mode in which its cycle-by-cycle responses to traffic fluctuations are gradually improved, over a period of several days or weeks, based on an MOE consisting of the calculated total traffic system wait time over the daily four-hour period.

Note that since the underlying MOE for the NN controller weight estimation is based on system-wide traffic data (i.e., data downstream from each traffic signal as well as upstream) over a several-hour time period, the effect of signal settings, turning movements, etc. on the future accumulation of traffic at internal queues is factored into the formation of the controller function. (This is an example of how a true system-wide solution would differ from a solution based on combining individual intersection, artery, or zonal solutions on a network-wide basis as done, e.g., in SCOOT.)

Figure 4:
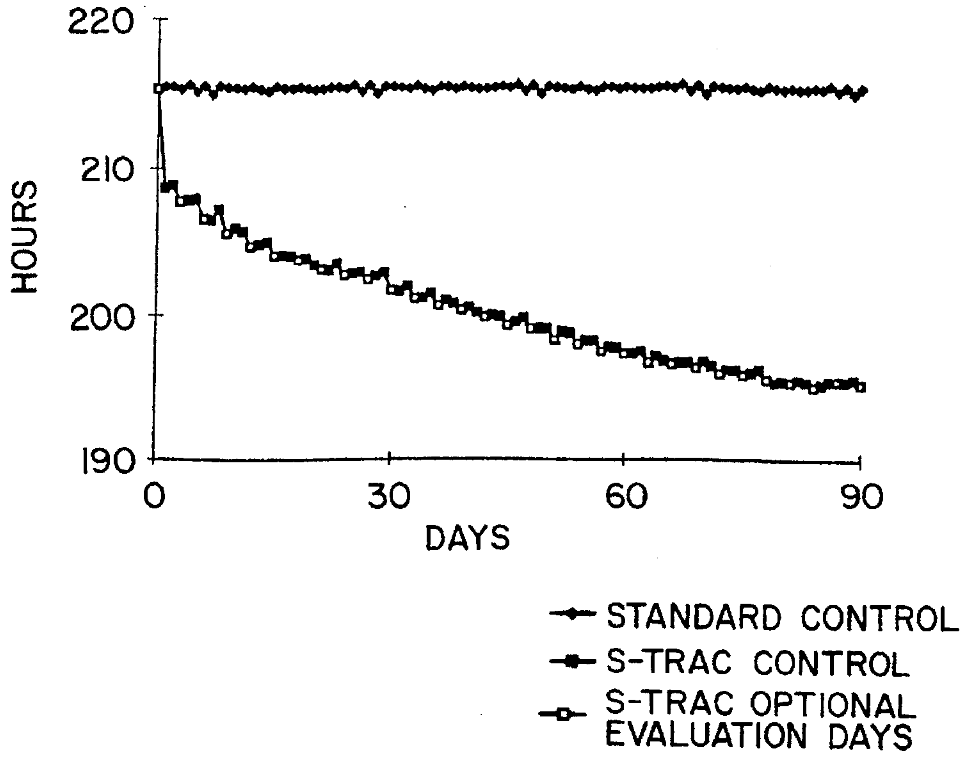
FIG. 4 is a graph illustrating the results of a simulation of an application of the invention to the area shown in FIG. 3 assuming constant arrival rates.
Figure 5:
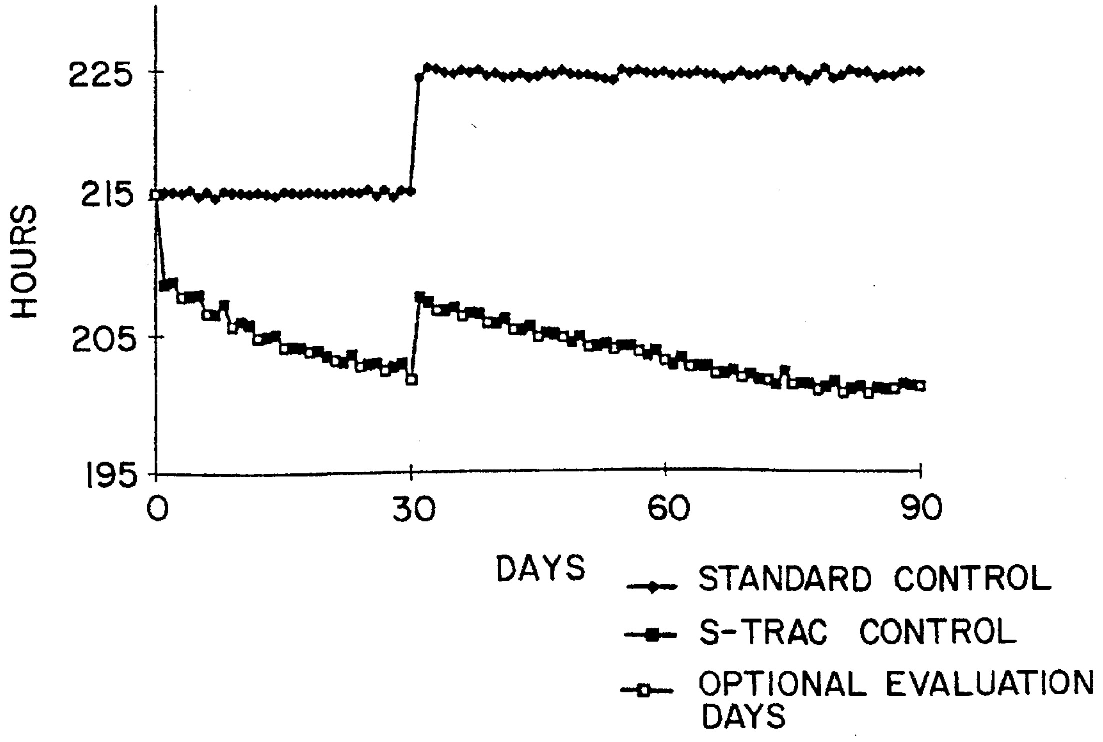
FIG. 5 is a graph illustrating the results of a simulation of an application of the invention to the area shown in FIG. 3 assuming an increase in system arrival rates on day 30.

The results of the simulation study of the system-wide traffic control algorithm are presented in FIG. 4 (constant mean arrival rate) and FIG. 5 (step increased mean arrival rate). In order to show true learning effects (and not just random chance as from a single realization) the curves in FIGS. 4 and 5 are based on an average of 100 statistically independent simulations. The fixed strategy assumed a green-time/total-cycle-time value of 0.55 for all signals along N-S arteries. This was in the specified range of prior strategies in-place in the Manhattan sector during the recording of actual data.

Every third day for the invention in both figs. represented an optional "evaluation day" (step 6 of implementation as discussed above) to demonstrate improved values of the MOE. However, only data from the other 60 "training days" were used in the SPSA algorithm; thus, the adaptive training period could have been reduced to 60 days.

The invention resulted in a net improvement of approximately 9.4% relative to the fixed-strategy-controlled system. This reduction in total wait time represents a reasonably large savings with a relatively small investment, particularly for high traffic density sectors. In comparison, major construction changes to achieve a net improvement in traffic flow of 9.4% in a well-developed area, such as for the traffic system in mid-Manhattan, would be enormously expensive.

In the step increase case, FIG. 5 shows a corresponding step increase in total system wait time under the fixed-time strategy. Under the invention, a step increase also occurred in total system wait time on day 30, but the wait time continued to decrease without any transient behavior subsequent to this phenomenon. Relative to the fixed strategy, an approximate 11.9% improvement is evident after the 90-day test period.

The invention makes signal timing adjustments for a complex road network without using a model for the system to accommodate short-term conditions such as congestion, accidents, brief construction blockages, adverse weather, etc. Through the use of SPSA, it also has the ability to automatically accommodate long-term system changes (such as seasonal traffic variations, new residences or businesses, long-term construction projects, etc.) without the cumbersome and expensive off-line remodeling process that has been customary in traffic control. The SPSA training process may be turned "on" or "off" as necessary to adapt to these long-term changes in a manner that would be essentially invisible to the drivers in the system.

I claim:

1. A method for managing a complex transportation system, wherein a model governing the system dynamics and measurement process is unknown, to achieve optimal traffic flow by automatically adapting to both daily non-recurring events and to long-term changes in the system by approximating a controller for the system without having to first build the model therefor and without having, thereafter, to periodically and manually recalibrate the model, the method comprising the steps of:

- using a plurality of sensors to obtain traffic flow information about the system;
- inputting the traffic flow information into a data processing means;
- approximating the controller using the data processing means and the traffic flow information comprising the steps of:
  - selecting a single function approximator to directly approximate the controller;
  - estimating the unknown parameters of the single function approximator in the controller using a stochastic approximation algorithm that does not require the model for the system; and
  - using the single function approximator to approximate the controller, wherein the controller is an output of the single function approximator; and
- using the controller to control traffic control means to achieve optimal traffic flow.

2. The method as recited in claim 1, the selecting a single function approximator step comprising the step of selecting a single continuous function approximator to directly approximate the controller.

3. The method as recited in claim 1, the estimating the unknown parameters step comprising the step of estimating the unknown parameters of the single function approximator in the controller using a simultaneous perturbation stochastic approximation algorithm.

4. The method as recited in claim 3, the selecting a single function approximator step comprising the step of selecting a neural network to directly approximate the controller.

5. The method as recited in claim 4, the selecting a neural network step comprising the step of selecting a multilayered, feed-forward neural network to directly approximate the controller.

6. The method as recited in claim 4, the selecting a neural network step comprising the step of selecting a recurrent neural network to directly approximate the controller.

7. The method as recited in claim 3, the selecting a single function approximator step comprising the step of selecting a polynomial to directly approximate the controller.

8. The method as recited in claim 3, the selecting a single function approximator step comprising the step of selecting a spline to directly approximate the controller.

9. The method as recited in claim 3, the selecting a single function approximator step comprising the step of selecting a trigonometric series to directly approximate the controller.

10. The method as recited in claim 3, the selecting a single function approximator step comprising the step of selecting a radial basis function to directly approximate the controller.

11. A computerized management system for achieving optimal traffic flow in a complex transportation system, wherein a model governing the transportation system dynamics and measurement process is unknown, by automatically adapting to both daily non-recurring events and to long-term changes in the transportation system by approximating a controller for the transportation system without having to first build the model therefor and without having, thereafter, to periodically and manually recalibrate the model, the management system comprising:

- a plurality of sensors for obtaining traffic flow information about the transportation system;
- a data processing means for receiving the traffic flow information;
- means for approximating the controller using the data processing means and the traffic flow information, the approximating the controller means comprising:
  - a single function approximator to directly approximate the controller;
  - means for estimating the unknown parameters of the single function approximator in the controller using a stochastic approximation algorithm that does not require the model for the system; and
  - means for using the single function approximator to approximate the controller, wherein the controller is an output of the single function approximator; and
- traffic control means using the controller to achieve optimal traffic flow.

12. The system as recited in claim 11, wherein the single function approximator comprises a single continuous function approximator to directly approximate the controller.

13. The system as recited in claim 11, the means for estimating the unknown parameters of the single function approximator in the controller comprising a simultaneous perturbation stochastic approximation algorithm.

14. The system as recited in claim 13, wherein the single function approximator comprises a neural network to directly approximate the controller.

15. The system as recited in claim 14, wherein the neural network comprises a multilayered, feed-forward neural network to directly approximate the controller.

16. The system as recited in claim 14, wherein the neural network comprises a recurrent neural network to directly approximate the controller.

17. The system as recited in claim 13, wherein the single function approximator comprises a polynomial to directly approximate the controller.

18. The system as recited in claim 13, wherein the single function approximator comprises a spline to directly approximate the controller.

19. The system as recited in claim 13, wherein the single function approximator comprises a trigonometric series to directly approximate the controller.

20. The system as recited in claim 13, wherein the single function approximator comprises a radial basis function to directly approximate the controller.

21. The method as recited in claim 1, further comprising, after the selecting a single function approximator step, the step of choosing an initial set of values for the unknown parameters of the single function approximator.

22. The method as recited in claim 21, wherein the initial set of values is derived from historical data.

23. The method as recited in claim 21, wherein the initial set of values is derived from a simulation.

24. The method as recited in claim 21, wherein the initial set of values is the set of values that causes the single function approximator to produce a reasonable output.

25. The method as recited in claim 1, wherein data input to the stochastic approximation algorithm comprises data from a time period less than or equal to twenty-four hours.

26. The method as recited in claim 25, wherein data input to the stochastic approximation algorithm comprises data from the same time period on two or more days.

27. The system as recited in claim 11, further comprising an initial set of values for the unknown parameters of the single function approximator.

28. The system as recited in claim 27, wherein the initial set of values is derived from historical data.

29. The system as recited in claim 27, wherein the initial set of values is derived from a simulation.

30. The system as recited in claim 27, wherein the initial set of values is the set of values that causes the single function approximator to produce a reasonable output.

31. The system as recited in claim 11, wherein data input to the stochastic approximation algorithm comprises data from a time period less than or equal to twenty-four hours.

32. The system as recited in claim 31, wherein data input to the stochastic approximation algorithm comprises data from the same time period on two or more days.

* * * * *